United States Patent Office 3,235,531
Patented Feb. 15, 1966

3,235,531
OXYMETHYLENE COPOLYMER STABILIZATION
Paul David Walker, Matawan, N.J., assignor to Celanese Corporation of America, New York, N.Y., a corporation of Delaware
No Drawing. Filed Dec. 22, 1964, Ser. No. 420,458
8 Claims. (Cl. 260—45.95)

This application is a continuation-in-part of United States application Serial No. 4,601 filed January 26, 1960, now abandoned.

This invention relates to oxymethylene copolymers and particularly to copolymers of high initial thermal stability.

Oxymethylene polymers, having recurring —$CH_2O$— units directly attached to each other, have been known for many years. They may be prepared by the polymerization of anhydrous formaldehyde or by the polymerization of trioxane which is a cyclic trimer of formaldehyde. Oxymethylene polymers vary in thermal stability and in molecular weight, depending on their method of preparation. Oxymethylene homopolymer of exceptionally high molecular weight and stability has been prepared by the repeated sublimation of trioxane from a temperature of 40° C. to a temperature of −80° C. Exceptionally high molecular weight polyoxymethylene has also been prepared by polymerizing anhydrous formaldehyde in the presence of aliphatic or aromatic primary amines or in the presence of arsines, stibines or phosphines.

High molecular weight polyoxymethylenes may be prepared in high yields and at rapid reaction rates by the use of catalysts comprising boron fluoride coordinate complexes with organic compounds in which oxygen or sulfur is the donor atom, as described in U.S. Patent No. 2,989,506 by Hudgin and Berardinelli.

Oxymethylene polymers of exceptional thermal stability have been prepared by copolymerizing trioxane with from 0.4 to 15 mol percent of a cyclic ether having at least two adjacent carbon atoms. Copolymers of this type are described in U.S. Patent No. 3,027,352 by Cheves T. Walling, Frank Brown and Kenneth W. Bartz. Such copolymers may be described as having at least one chain containing from about 85 to 99.9 mol percent of oxymethylene units interspersed with from about 0.1 to about 15 mol percent of —O—R— units wherein R is a divalent radical containing at least two carbon atoms directly linked to each other and positioned in the chain between the two valences with any substituent in the R radical being inert. The —O—R— units are present in an amount sufficient that a plurality of the —O—R— units are present in each chain and are positioned at various points along each chain. The preferred copolymers are those made up of oxymethylene and oxyethylene groups, such as copolymers of trioxane with dioxolane or with ethylene oxide.

Other oxymethylene polymers and methods of preparation therefor are disclosed by Kern et al. in Angewandte Chemie 73 (6), 177–186 (March 21, 1961), including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc. These and other polymers are disclosed by Sittig in "Polyacetals—What You Should Know," Petroleum Refiner 41 (11), pp. 131–170, November 1962.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable terpolymers include those disclosed in U.S. patent application Serial No. 229,715, filed October 10, 1962, by W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers are suitable for making molded articles, films, sheets, fibers, pipes, etc.

By the use of techniques which are conductive to the production of polymers of high molecular weight and by the incorporation of comonomers, as described above, it has been possible to produce polymers having oxymethylene groups directly attached to each other which are stable against thermal degradation. By further incorporation of chemical stabilizers it has been possible to stabilize oxymethylene copolymers so that their degradation rate at 222° C. is less than about 0.1 weight percent per minute for most of the copolymer mass when the polymer is maintained in an open vessel in a circulating air oven at 222° C. However, despite this high stability for most of the copolymer mass, it has been difficult to reduce the initial degradation rate of the copolymer (at 222° C.) in air to a satisfactory level. It has been found that a copolymer may be reduced to a degradation rate (at 222° C. in air) for most of its mass of less than 0.1 weight percent per minute while the initial 0.5 to 20 weight percent of the copolymer has a higher degradation rate (at 222° C. in air) of the order of between 1 and 0.4 weight percent per minute. For the purpose of convenience the degradation rate (at 222° C. in air) for most of the copolymer mass is hereinafter designated as the "base" degradation rate.

During molding processes, oxymethylene copolymers are generally heated to temperatures between about 180° C. and about 230° C. for relatively short periods between about 5 seconds and about 5 minutes. Even where the base degradation rate has been reduced to below 0.1 weight percent per minute, it has been found that molded products have uneven surface characteristics, due to evolution of formaldehyde gas, unless the initial degradation rate is also reduced, preferably to below this level. It is an object of this invention to provide a method for reducing the initial degradation rate (at 222° C. in air) of oxymethylene copolymers.

In accordance with this invention a method is provided for stabilizing an oxymethylene copolymer which has a given rate of initial thermal degradation in terms of percent of weight lost per minute when it is maintained in an open vessel in a circulating air oven at 222° C. and a lower rate of thermal degradation for most of the polymer mass, which comprises heating said polymer to a temperature which ranges from about 50° C. below its melting point to about 60° C. above its melting point at a subatmospheric pressure, and maintaining said copolymer within said temperature range and at subatmospheric pressure, while permitting the escape of volatile products therefrom until the copolymer has an initial degradation rate which is not substantially higher than the degradation rate for most of the polymer mass prior to said heating step. The preferred temperature range is above the melting point. The subatmospheric pressure is preferably between about 1 mm. and 300 mm. of Hg absolute.

The melting point is determined by heating a small sample of the polymer on a hot stage to raise its temperature by about 2-3° C. per minute and observing the temperature at which the polymer becomes transparent and flows. The melting point of oxymethylene homopolymers is generally between about 185° and 190° C. Copolymers run somewhat lower in melting point so that a copolymer containing about 5% weight of dioxolane melts at about 160° to 165° C.

When an oxymethylene copolymer is maintained at a temperature above its melting point at atmospheric pressure or above for a sufficient period of time its initial thermal degradation rate is effectively reduced. However, the process of this invention permits the achievement of lower levels of degradation at substantially the same net polymer loss.

It has been found that polyoxymethylenes tend to degrade from the ends of the molecules by a process known as "unzippering" wherein oxymethylene units are removed from the ends of the chain until either the polymeric chain has substantially completely degraded or until the presence of a more stable unit in the chain prevents further unzippering. When the oxymethylene units are removed from the end of the polymeric chain formaldehyde in gaseous form is generated.

In the copolymers which are treated in accordance with this invention the comonomeric —O—R— units have been found to be more stable to thermal or alkaline degradation than the oxymethylene units, when R is a divalent radical containing at least two carbon atoms directly linked to each other and positioned in the chain between the two valences as indicated above.

Thus it is seen that under certain conditions the oxymethylene copolymers are degraded from the ends of the molecules until the comparatively stable comonomeric units are reached, at which time the molecules of the polymer are very stable with respect to any further thermal degradation, alkaline degradation, etc. The subject invention relates to a method of removing the comparatively unstable oxymethylene units from the end of the polymeric chain until the chain is terminated by the comparatively stable units containing at least two carbon atoms. In the removal of the terminal oxymethylene units volatilizable formaldehyde is formed which of course must be removed from the polymeric material.

The present invention relates specifically to heating such a copolymer to a temperature within a specified range at a subatmospheric pressure, while mechanically working and continuously exposing fresh surfaces of the material to permit the escape of volatile products. This is done until the treated material has "an initial thermal degradation rate" having certain characteristics as described.

In the preferred embodiment of this invention the initial degradation rate (at 222° C. in air) of the polymer which is subjected to the above described treatment is between about 1% and 0.2% weight percent per minute and the base degradation rate (at 222° C. in air) the polymer is between 0.1 and 0.0 weight percent. After completion of the treatment, in the preferred embodiment, substantially all of the polymer has a relatively uniform degradation rate which is comparable and in many cases superior to the base degradation rate of the polymer before treatment.

Generally the polymer which is subjected to the above described treatment is brought to the desired base degradation rate (at 222° C. in air) by copolymerizing with a cyclic ether and by the addition of chemical stabilizers. Stabilization to reduce the base thermal degradation rate by copolymerizing and by the incorporation of chemical stabilizers does not, per se, constitute a part of the invention claimed herein.

The use of the method of this invention is not restricted to any particular chemical stabilizer or stabilizer system. The term "chemical stabilizer," as used herein, is intended to designate any single compound or mixture of compounds which will reduce the base thermal rate of degradation of an oxymethylene polymer from a higher rate to a rate not higher than 0.1 weight percent per minute when the polymer is maintained in an open vessel in a circulating air oven at 222° C. The proportion of stabilizer incorporated depends upon the specific stabilizer used. A proportion between about 0.05 and 10 weight percent (based on the weight of polymer) has been found to be suitable for most stabilizers.

One suitable chemical stabilizer is a combination of an antioxidant ingredient, such as phenolic antioxidant and most suitably, a substituted bisphenol and an ingredient to inhibit chain scission, generally a compound or polymer containing trivalent nitrogen atoms where are bonded only to carbon and hydrogen atoms. Suitable scission inhibitors include carboxylic polyamides, polyurethanes, substituted polyacrylamides, polyvinyl pyrrolidone, hydrazines, compounds having 1 to 6 amide groups, proteins, compounds having tertiary amine and terminal amide groups and compounds having amidine groups. Suitable scission inhibitors as well as suitable antioxidants and proportions are disclosed in U.S. Patent No. 3,152,101 by Dolce, U.S. Patent No. 3,144,431 by Dolce, Berardinelli and Hudgin, U.S. Patent No. 3,116,267 by Dolce, application Serial No. 258,126, filed by Berardinelli on February 13, 1963, application Serial No. 838,832, filed by Dolce and Hudgin on September 9, 1959, application Serial No. 262,348 filed by Kray and Dolce on March 4, 1963, and application Serial No. 347,028, filed by Berardinelli, Kray and Dolce on February 24, 1964. The disclosure of the above mentioned applications are incorporated herein by reference.

The chemical stabilizer may be incorporated into the polymer by dissolving both the polymer and the chemical stabilizer in a common solvent and thereafter evaporating the solution to dryness. Alternatively, the chemical stabilizer may be incorporated into the polymer by applying a solution of the chemical stabilizer to finely divided polymer, as in a slurry, and thereafter filtering the polymer and evaporating dryness. The chemical stabilizer, in finely divided dry state may be blended into finely divided polymer in any suitable blending apparatus.

One suitable method of incorporation of the chemical stabilizer is by blending a dry solid chemical stabilizer into the plastic polymer, while the latter is being kneaded as on heated rolls or through an extruder.

The heating step of this invention is most rapidly carried out in a system in which a large polymer surface is exposed, or in a system wherein fresh polymer surfaces are continuously exposed. An example of the former is a system wherein the polymer is thinly spread on a large surface, such as on a moving belt in a vacuum chamber. An example of a system in which polymer surfaces are continuously exposed is in working, or kneading of the polymer within a vacuum chamber on the rolls of a compounding mill, in a dough mixer, such as a Banbury mixer or through an extruder.

One suitable system for carrying out this invention utilizes the rolls of a compounding mill. The polymer and chemical stabilizer are thoroughly mixed on heated rolls within a vacuum chamber until a uniform admixture is obtained. The mixing action on the heated rolls is then continued with the mass being maintained at the desired temperature while continuously exposing fresh surfaces of the polymer to volatilization, until the desired degree of initial thermal stability is obtained.

The reduced pressure atmosphere is ordinarily an air atmosphere. However, other gaseous atmospheres, such as a nitrogen atmosphere, under reduced pressure may be used, if desired.

The period necessary for heating in order to obtain the desired thermal stability may be estimated from previous experience with similar polymers, similar stabilizing agents and similar proportions. Ordinarily, the heating is continued until between about 0.5 and about 20 weight percent of the polymer is lost. The time necessary for achieving stabilization will ordinarily vary between about 1 minute and about six hours when the polymer is maintained at subatmospheric pressure at a temperature between the melting point and about 60° C. above the melting point. The shorter periods are associated with processes in which the polymer is worked to expose fresh surfaces, and the longer periods are for simple heating.

After the heating step is completed the polymer may have conglomerated into a mass which must be comminuted for convenient molding. When the polymer has been treated on cylindrical rolls it is in the form of a sheet upon completion of the treatment and may be conveniently comminuted into pellets by scoring and cutting the sheet. When the polymer has been treated in other apparatus, such as in a dough mixer, it is recovered in the form of large, irregular lumps and is most conveniently sheeted on rolls before being scored and cut.

The comminuted polymer, in the form of pellets passing through a ¼" screen, is in convenient form for molding, including injection molding, extrusion, compression molding and other shaping operations. In some cases, as where a sheet is desired, it may be possible to shape the polymer immediately after the heat treatment step without cooling. In such cases, the comminution step may be omitted. For example, after heat treating a polymer on heated cylindrical rolls for a period sufficient to achieve the desired initial degradation rate, the polymer may then be calendered to a sheet of the desired thickness.

*Example I.—Preparation of the polymer*

Four batches of trioxane-dioxolane copolymer were prepared and combined. Each batch was run with about 6000 grams of trioxane and ¼ of its weight of cyclohexane (including the cyclohexane used to dilute the catalyst as described below). 5.0 wt. percent of dixolane and enough boron fluoride dibutyl etherate to provide a boron fluoride concentration of 65 parts per million (based on trioxane) were added. Polymerization was initiated at 53.5° C. and maintained for two hours at a temperature which was allowed to rise during the first half hour to about 60° C. The combined products had an I.V. of 1.8 and a melting point of 163–168° C. The I.V. was measured in a 0.1 solution in p-chlorophenol containing 2 weight percent of α-pinene.

*Example II.—Incorporation of the stabilizer*

The copolymer of Example I was blended in a Patterson-Kelly blender with a 1 wt. percent of 2,2'-methylene-bis-(4-methyl-6-tertiary butyl phenol) and 1 wt. percent of polyvinyl pyrrolidone (M.W. about 30,000). The blender is made up of two cylindrical chambers which meet at a vertex to form a V. The blender rotates rapidly about an axis which bisects both arms of the V. The blend was extruded through an NRM extruder at a screw speed of 61 r.p.m. and a die temperature of 390° C. The extruder has a barrel which is one inch in diameter and 20" in length. The screw contains 20 flights which vary in depth depending upon the position in the barrel. The die has a circular opening (3/16 inch in diameter) 3/16 and is separated from the screw by a breaker plate. The extruded rod (3/16" in diameter) was chopped into pieces about ¼ inch in length.

*Example III*

The extended pellets of Example II were heated in a Pyrex tube equipped with a vacuum takeoff arm and immersed in a heated oil bath. The pellets were maintained at 220° C. and 100 mm. Hg absolute for ¾ hour.

*Example IV*

For comparison purposes, another portion of the polymer product of Example II was heated at atmospheric pressure on a pair of heated rolls. The rolls were 6" in diameter and 12" long and were heated to 176° C. (The polymer temperature was actually higher due to the heat generated by the internal friction caused by the working action.) The polymer was worked on the rolls for a total of ten minutes, including five minutes of charging time. The results were as follows:

| Polymer | Degradation Rate [a] | Color | Recovery, percent |
|---|---|---|---|
| Example II (no heat treatment). | 0.42 for 1st 3%, 0.08 thereafter. | | |
| Example III (heating under reduced pressure). | 0.04 from beginning. | White | 92 |
| Example IV (heated at atmospheric pressure). | 0.21 for 1st 2%, 0.04 thereafter. | Off-white | 92 |

[a] Wt. percent loss per minute when polymer is maintained in open vessel in circulating air oven at 222° C.

It is to understood that the foregoing detailed description is given merely by way of illustration and that many variations may be made therein without departing from the spirit of my invention.

The embodiments of the invention in which an exclusive property or privilege is claimed are defined as follows:

1. Method for stabilizing any oxymethylene copolymer having a melting point of at least 150° C. and having at least one chain containing
   (1) from about 85 to about 99.9 mol percent of oxymethylene units interspersed with
   (2) from about 0.1 to about 15 mol percent of —O—R— units wherein R is a divalent radical containing at least two carbon atoms directly linked to each other and positioned in said chain between the two valences, any substituents in said R radical being inert, a plurality of said —O—R— units being present in each chain and being positioned at various points along said chain, said method comprising
   (1) heating said copolymer, in admixture with a chemical stabilizer, to a temperature which ranges from about 50° C. below its melting point to about 60° C. above its melting point at a subatmospheric pressure between about 1 mm. and 300 mm. of Hg absolute and
   (2) maintaining said copolymer-stabilizer mixture within said temperature range while mechanically working and continuously exposing fresh surfaces of said mixture to permit the escape of volatile products until said mixture has an initial thermal degradation rate which is
      (a) less than 0.1 weight percent per minute and
      (b) not substantially higher than the base degradation rate of the untreated copolymer-stabilizer mixture said degradation rates being stated in terms of weight lost per minute when said mixture is maintained in an open vessel in a circulating air oven at 222° C., the mixture resulting from said treatment being capable of being injection molded.

2. The method of claim 1, wherein said untreated copolymer-stabilizer mixture has an initial degradation rate above 0.1%.

3. The method of claim 1, wherein said chemical stabilizer is a phenolic stabilizer.

4. Method for stabilizing an oxymethylene copolymer having a melting point of at least 150° C. and having at least one chain containing
   (1) from about 85 to about 99.9 mol percent of oxymethylene units interspersed with
   (2) from about 0.1 to about 15 mol percent of —O—R— units wherein R is a divalent radical containing at least two carbon atoms directly linked to each other and positioned in said chain between the two valences, any substituents in said R radical being inert, a plurality of said —O—R— units being present in each chain and being positioned at various points along said chain,
said method comprising
(1) heating said copolymer, in admixture with an alkylene bisphenol chemical stabilizer, to a temperature which ranges from about 50° C. below its melting point to about 60° C. above its melting point at a subatmospheric pressure between about 1 mm. and 300 mm. of Hg absolute and
(2) maintaining said copolymer-stabilizer mixture within said temperature range while mechanically working and continuously exposing fresh surfaces of said mixture to permit the escape of volatile products until said mixture has an initial thermal degradation rate which is
(a) less than 0.1 weight percent per minute and
(b) not substantially higher than the base degradation rate of the untreated copolymer-stabilizer mixture
said degradation rates being stated in terms of weight lost per minute when said mixture is maintained in an open vessel in a circulating air oven at 222° C., the mixture resulting from said treatment being capable of being injection molded.

5. The method of claim 4, including the step of thereafter comminuting said copolymer to a particulate form.

6. The method of claim 5, including the step of thereafter molding said copolymer at a temperature between about 160° C. and about 220° C. over a period between about 5 seconds and about three minutes.

7. Method for stabilizing an oxymethylene copolymer having a melting point of at least 150° C. and having at least one chain containing
(1) from about 85 to about 99.9 mol percent of oxymethylene units interspersed with
(2) from about 0.1 to about 15 mol percent of —O—R— units wherein R is a divalent radical containing at least two carbon atoms directly linked to each other and positioned in said chain between the two valences, any substituents in said R radical being inert, a plurality of said —O—R— units being present in each chain and being positioned at various points along said chain,
said method comprising
(1) heating said copolymer, in admixture with a chemical stabilizer, to a temperature above the melting point of said copolymer but not higher than about 60° C. above said melting point at a subatmospheric pressure between about 1 mm. and 300 mm. of Hg absolute and
(2) maintaining said copolymer stabilizer mixture within said temperature range while mechanically working and continuously exposing fresh surfaces of said mixture to permit the escape of volatile products until said mixture has an initial thermal degradation rate which is
(a) less than 0.1 weight percent per minute and
(b) not substantially higher than the base degradation rate of the untreated copolymer-stabilizer mixture
said degradation rates being stated in terms of weight lost per minute when said mixture is maintained in an open vessel in a circulating air oven at 222° C., the mixture resulting from said treatment being capable of being injection molded.

8. Method for stabilizing an oxymethylene copolymer having a melting point of at least 150° C. and having at least one chain containing
(1) from about 85 to about 99.9 mol percent of oxymethylene units interspersed with
(2) from about 0.1 to about 15 mol percent of —O—R— units wherein R is a divalent radical containing at least two carbon atoms directly linked to each other and positioned in said chain between the two valences, any substituents in said R radical being inert, a plurality of said —O—R— units being present in each chain and being positioned at various points along said chain,
said method comprising
(1) heating said copolymer, in admixture with a chemical stabilizer, to a temperature which ranges from about 50° C. below its melting point to about 60° C. above its melting point at a subatmospheric pressure between about 1 mm. and 300 mm. of Hg absolute.
(2) maintaining said copolymer-stabilizer mixture within said temperature range in a system wherein the polymer is thinly spread on a large surface to permit the escape of volatile products until said mixture has an initial thermal degradation rate which is
(a) less than 0.1 weight percent per minute and
(b) not substantially higher than the base degradation rate of the untreated copolymer-stabilizer mixture
said degradation rates being stated in terms of weight lost per minute when said mixture is maintained in an open vessel in a circulating air oven at 222° C., the mixture resulting from said treatment being capable of being injection molded.

References Cited by the Examiner
UNITED STATES PATENTS 2,966,476  12/1960  Kralovec et al. _____ 260—45.95
3,103,499  9/1965  Dolce et al. _____ 260—45.7

FOREIGN PATENTS 748,856  12/1953  Great Britain.

LEON J. BERCOVITZ, *Primary Examiner.*